(12) United States Patent
Dan

(10) Patent No.: US 8,557,457 B2
(45) Date of Patent: Oct. 15, 2013

(54) FUEL CELL SYSTEM AND METHOD OF OPERATING THE FUEL CELL SYSTEM

(75) Inventor: Koji Dan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 746 days.

(21) Appl. No.: 12/676,252

(22) PCT Filed: Aug. 22, 2008

(86) PCT No.: PCT/JP2008/065477
§ 371 (c)(1),
(2), (4) Date: Mar. 3, 2010

(87) PCT Pub. No.: WO2009/031459
PCT Pub. Date: Mar. 12, 2009

(65) Prior Publication Data
US 2010/0203405 A1   Aug. 12, 2010

(30) Foreign Application Priority Data
Sep. 3, 2007   (JP) ................................. 2007-228212

(51) Int. Cl.
*H01M 8/06* (2006.01)
(52) U.S. Cl.
USPC .......................... 429/423; 429/416; 429/425
(58) Field of Classification Search
USPC ....................................................... 429/423
See application file for complete search history.

(56) References Cited

U.S. PATENT DOCUMENTS

| | | | |
|---|---|---|---|
| 6,447,942 B1 * | 9/2002 | Ovshinsky et al. | 429/418 |
| 2002/0168555 A1 * | 11/2002 | Mukerjee et al. | 429/13 |
| 2004/0202914 A1 | 10/2004 | Sridhar et al. | |
| 2005/0095469 A1 | 5/2005 | Bednarz et al. | |
| 2009/0104482 A1 | 4/2009 | Miyazaki | |

FOREIGN PATENT DOCUMENTS

EP    1852930 A1    11/2007

(Continued)

OTHER PUBLICATIONS

Japanese Office Action for Application No. 2007-228212, 5 pages, dated May 15, 2012.

(Continued)

*Primary Examiner* — Barbara Gilliam
*Assistant Examiner* — Gary Harris
(74) *Attorney, Agent, or Firm* — Nelson Mullins Riley & Scarborough LLP; Anthony A. Laurentano

(57) ABSTRACT

A method of operating a fuel cell system includes the steps of detecting whether supply of a raw fuel to a fuel cell module is stopped or not, starting supply of water vapor to an electrode surface of an anode based on the temperature of a fuel cell stack when stop of the supply of the raw fuel is detected, starting supply of reverse electrical current to an electrolyte electrode assembly in a direction opposite to electrical current flowing at the time of power generation based on the temperature of the fuel cell stack, stopping the supply of the reverse electrical current at least based on any of the temperature of the fuel cell stack and the temperature of an evaporator, and stopping the supply of the water vapor at least based on any of the temperature of the fuel cell stack and the temperature of the evaporator.

2 Claims, 11 Drawing Sheets

(56) References Cited

FOREIGN PATENT DOCUMENTS

| | | |
|---|---|---|
| JP | 2003-238110 | 8/2003 |
| JP | 2005-293951 | 10/2005 |
| JP | 2006-66244 | 3/2006 |
| JP | 2006066244 A * | 3/2006 |
| JP | 2006-228618 | 8/2006 |
| JP | 2006-331680 | 12/2006 |
| WO | 06/090685 A1 | 8/2006 |
| WO | 07/137068 A1 | 11/2007 |

OTHER PUBLICATIONS

International Search Report for Application No. PCT/JP2008/065477, dated Feb. 29, 2009.

* cited by examiner

FUEL CELL SYSTEM AND METHOD OF OPERATING THE FUEL CELL SYSTEM

Related Applications

This application is a 35 U.S.C. 371 national stage filing of International Application No. PCT/JP2008/065477, filed Aug. 22, 2008, which claims priority to Japanese Patent Application No. 2007-228212 filed on Sept. 3, 2007 in Japan. The contents of the aforementioned applications are hereby incorporated by reference.

TECHNICAL FIELD

The present invention relates to a fuel cell system including a fuel cell stack, an evaporator, a reformer, and a control device. The fuel cell stack is formed by stacking a plurality of fuel cells for generating electricity in power generation consuming a fuel gas and an oxygen-containing gas supplied to the fuel cells. Each of the fuel cells is formed by stacking an electrolyte electrode assembly and a separator. The electrolyte electrode assembly includes an anode, a cathode, and an electrolyte interposed between the anode and the cathode. The evaporator produces a mixed fuel of a raw fuel chiefly containing hydrocarbon and water vapor obtained by evaporating water. The reformer produces the fuel gas by reforming the mixed fuel. Further, the present invention relates to a method of operating the fuel cell system.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas and CO generated from hydrocarbon raw material by a reformer are used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas).

The solid oxide fuel cell (SOFC) is a fuel cell operated at high temperature. For example, when supply of the fuel gas is stopped during operation, the anode is oxidized, and the fuel cell may be degraded undesirably.

In this regard, for example, a fuel cell system described in Japanese Laid-Open Patent Publication No. 2006-066244 includes detection means for detecting a state where no fuel is supplied to the fuel cell, and emergency stop means for emergently stopping operation of the fuel cell when the detection means detects that no fuel is supplied to the fuel cell.

However, in the technique described in Japanese Laid-Open Patent Publication No. 2006-066244, as the emergency stop means, a tank filled with an inert gas needs to be provided in the fuel cell system. Therefore, the fuel cell system is complicated, and the overall size of the fuel cell system becomes large. The cost of providing the fuel cell system is high.

DISCLOSURE OF INVENTION

The present invention has been made to solve the problems of this type, and an object of the present invention is to provide a fuel cell system and a method of operating the fuel cell system in which it is possible to suitably and reliably carry out emergency stop process for the operation of the fuel cell system efficiently without requiring any purge gas supply system additionally.

The present invention relates to a fuel cell system comprising a fuel cell module and a control device. The fuel cell module includes a fuel cell stack, an evaporator, and a reformer. The fuel cell stack is formed by stacking a plurality of fuel cells for generating electricity in power generation consuming a fuel gas and an oxygen-containing gas supplied to the fuel cells. Each of the fuel cells is formed by stacking an electrolyte electrode assembly and a separator. The electrolyte electrode assembly includes an anode, a cathode, and an electrolyte interposed between the anode and the cathode. The evaporator produces a mixed fuel of a raw fuel chiefly containing hydrocarbon and water vapor obtained by evaporating water, and the reformer produces the fuel gas by reforming the mixed fuel. Further, the present invention relates to a method of operating the fuel cell system.

According to an aspect of the present invention, the control device of the fuel cell system includes a reactant gas detection unit for detecting a state where supply of the raw fuel or the oxygen-containing gas to the fuel cell module is stopped, a water vapor supply unit for starting the supply of the water vapor to an electrode surface of the anode based on the temperature of the fuel cell stack when the stop of the raw fuel or the oxygen-containing gas to the fuel cell module is detected, and stopping the supply of the water vapor at least based on any of the temperature of the fuel cell stack and the temperature of the evaporator, and a reverse electrical current supply unit for starting supply of reverse electrical current to the electrolyte electrode assembly in a direction opposite to electrical current flowing at the time of power generation based on the temperature of the fuel cell stack, and stopping the supply of the reverse electrical current at least based on any of the temperature of the fuel cell stack and the temperature of the evaporator.

Further, according to another aspect of the present invention, the control device of the fuel cell system includes a water detection unit for detecting a state where supply of the water to the fuel cell module is stopped, and a raw fuel supply unit for temporarily stopping the supply of the raw fuel to the fuel cell module when the stop of the supply of the water to the fuel cell module is detected, starting the supply of the raw fuel to the electrode surface of the anode based on the temperature of the fuel cell stack, and stopping the supply of the raw fuel again based on the temperature of the fuel cell stack.

According to another aspect of the present invention, the method of operating the fuel cell system includes the steps of detecting whether the supply of the raw fuel or the oxygen-containing gas to the fuel cell module is stopped or not, starting the supply of the water vapor to an electrode surface of the anode based the temperature of the fuel cell stack when stop of the supply of the raw fuel or the oxygen-containing gas to the fuel cell module is detected, starting supply of reverse electrical current to the electrolyte electrode assembly in a direction opposite to electrical current flowing at the time of power generation based on the temperature of the fuel cell stack, stopping the supply of the reverse electrical current at least based on any of the temperature of the fuel cell stack and the temperature of the evaporator, and stopping the supply of the water vapor at least based on any of the temperature of the fuel cell stack and the temperature of the evaporator.

According to another aspect of the present invention, the method of operating the fuel cell system includes the steps of detecting whether the supply of the water to the fuel cell module is stopped or not, temporarily stopping the supply of the raw fuel to the fuel cell module when stop of the supply of the water to the fuel cell module is detected, starting the supply of the raw fuel to the electrode surface of the anode based on the temperature of the fuel cell stack, and stopping the supply of the raw fuel again based on the temperature of the fuel cell stack.

In the present invention, the water vapor and the reverse electrical current are supplied to cause water electrolysis at the anode. As a result, hydrogen is generated on the electrode surface of the anode. Thus, it is possible to maintain the hot electrode surface of the anode in a reducing state, and suitably prevent oxidation of the anode of the electrolyte electrode assembly. Even if emergency stop becomes required because the supply of the fuel gas or the oxygen-containing gas is stopped, it is possible to suppress degradation of the fuel cell stack. Accordingly, improvement in the reliability and durability is achieved, and the product life is prolonged advantageously.

Thus, it is possible to emergently stop operation of the fuel cell system simply by setting the timings of supplying and stopping the water vapor and the reverse electrical current without requiring any purge gas supply system additionally. Accordingly, the fuel cell system is simplified, and can be provided at low cost easily.

Further, in the present invention, when the water supply is stopped, the supply of the raw fuel to the electrode surface of the anode is temporarily prevented. Therefore, it is possible to prevent occurrence of carbon precipitation (coking). Further, by supplying and stopping the raw fuel to the electrode surface of the anode, it is possible to maintain the electrode surface of the anode in a reducing state, and suitably prevent oxidation of the anode of the electrolyte electrode assembly. Thus, even if emergency stop becomes required because the supply of the water vapor is stopped, it is possible to suppress degradation of the fuel cell stack. Accordingly, improvement in the reliability and durability is achieved easily, and the product life is prolonged advantageously.

Thus, it is possible to emergently stop operation of the fuel cell system due to the stop of the water supply simply by setting the timings of supplying and stopping the raw fuel without requiring any purge gas supply system additionally. Accordingly, the fuel cell system is simplified, and can be provided at low cost easily.

BEST MODE FOR CARRYING OUT THE INVENTION

Figure 1:
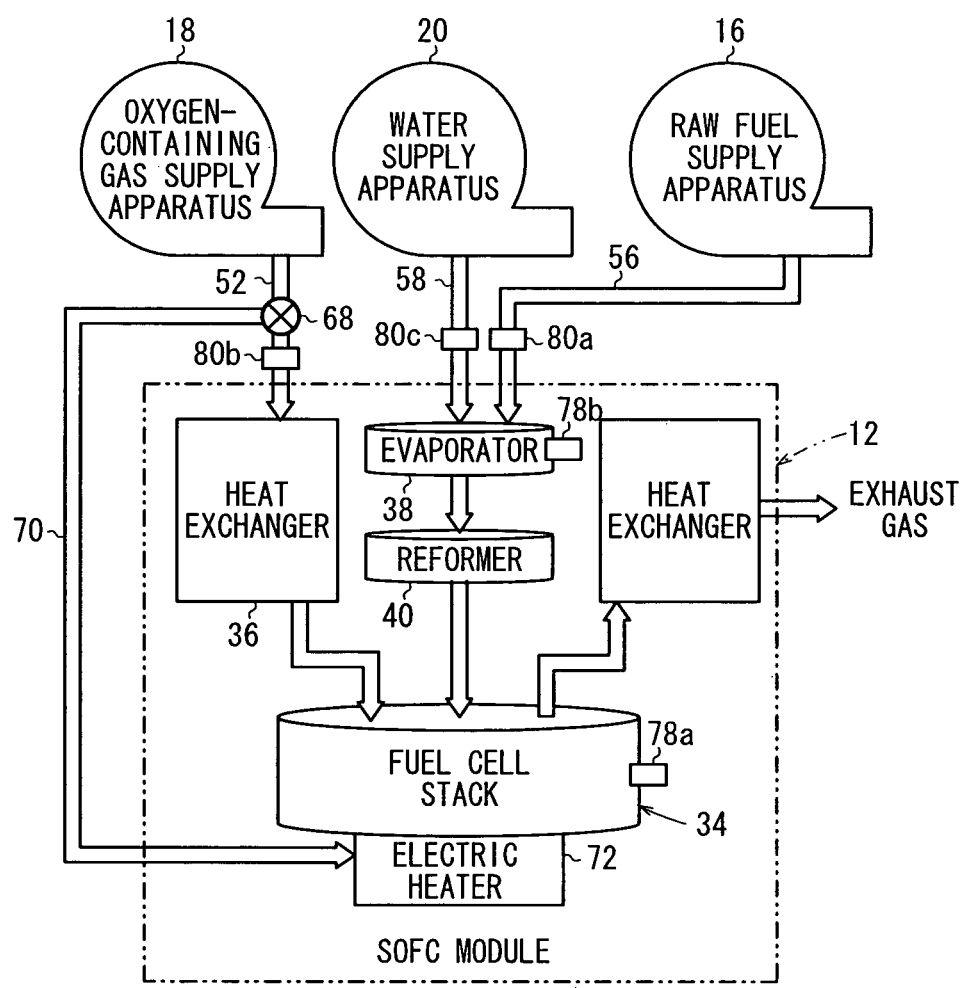
FIG. 1 is a diagram schematically showing a mechanical circuit of a fuel cell system according to an embodiment of the present invention.
Figure 2:
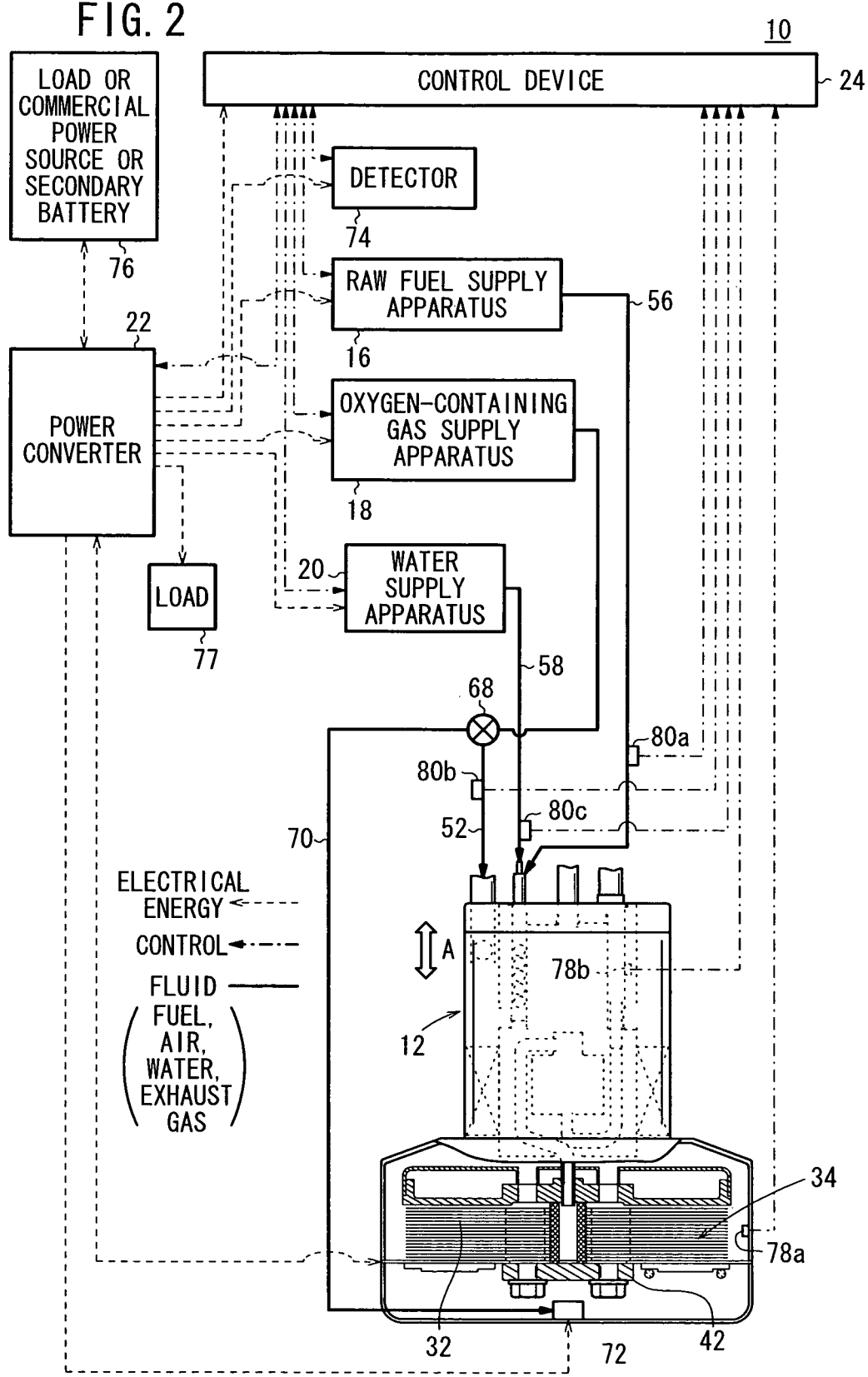
FIG. 2 is a circuit diagram showing the fuel cell system.

FIG. 1 is a diagram schematically showing structure of a mechanical circuit of a fuel cell system 10 according to an embodiment of the present invention, and FIG. 2 is a circuit diagram showing the fuel cell system 10.

The fuel cell system 10 is used in various applications, including stationary and mobile applications. For example, the fuel cell system 10 is mounted on a vehicle. The fuel cell system 10 includes a fuel cell module (SOFC module) 12 for generating electrical energy in power generation by electrochemical reactions of a fuel gas (hydrogen gas) and an oxygen-containing gas (air), a raw fuel supply apparatus (including a fuel gas pump) 16 for supplying a raw fuel (e.g., city gas) to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12.

Figure 3:
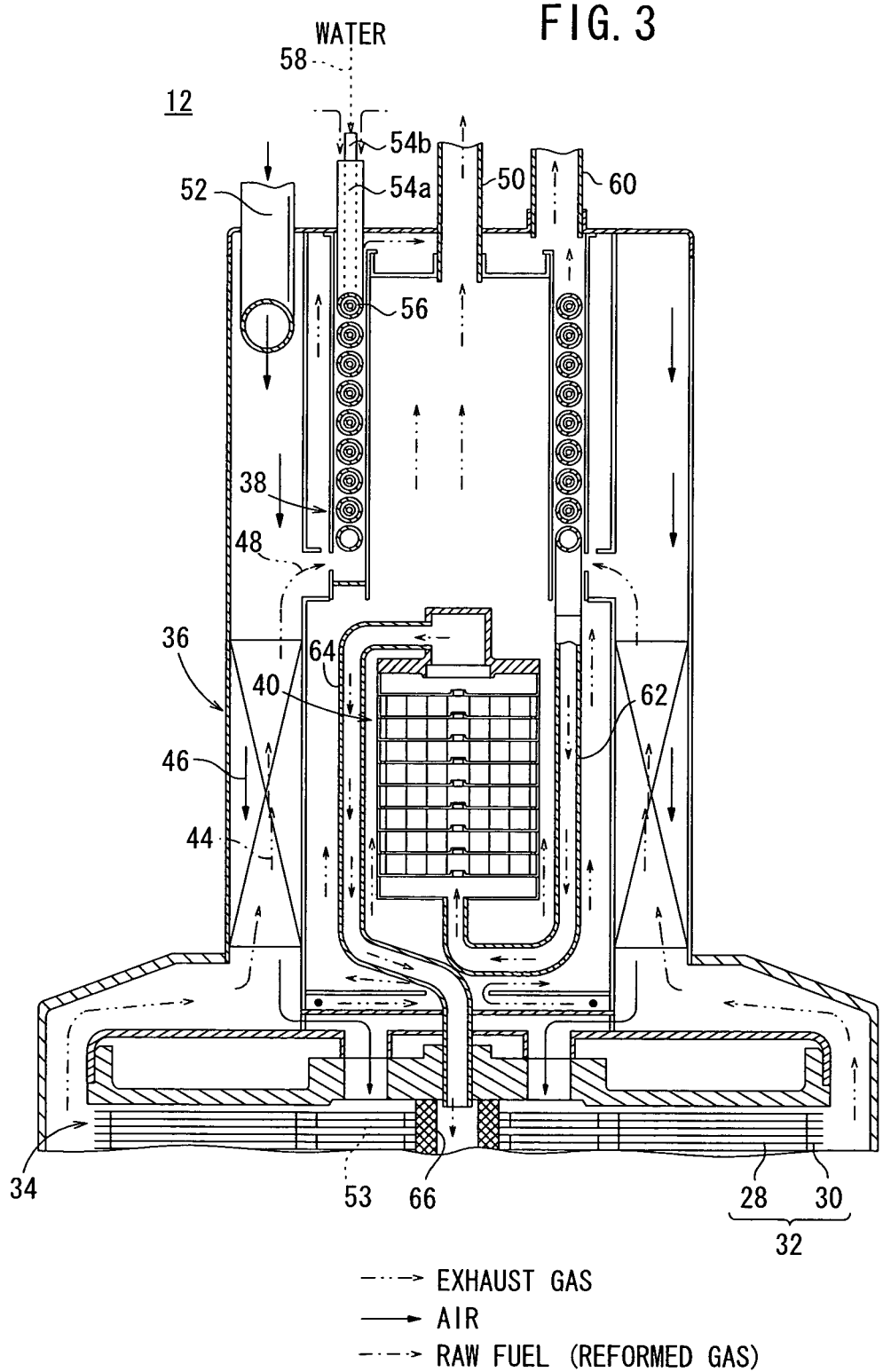
FIG. 3 is a cross sectional view showing main components of a fuel cell module of the fuel cell system.

As shown in FIG. 3, the fuel cell module 12 includes a fuel cell stack 34 formed by stacking a plurality of solid oxide fuel cells 32 in a vertical direction. The fuel cells 32 are formed by stacking electrolyte electrode assemblies 28 and separators 30. Though not shown, each of the electrolyte electrode assemblies 28 includes a cathode, an anode, and an electrolyte (solid oxide) interposed between the cathode and the anode. For example, the electrolyte is made of ion-conductive solid oxide such as stabilized zirconia.

At an upper (or lower) end of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of the raw fuel and water vapor, and a reformer 40 for reforming the mixed fuel to produce a reformed gas are provided. The fuel cell stack 34, the heat exchanger 36, the evaporator 38 and the reformer 40 make up a fuel cell module 12.

At a lower (or upper) end of the fuel cell stack 34 in the stacking direction, a load applying mechanism 42 for applying a tightening load to the fuel cells 32 of the fuel cell stack 34 in the direction indicated by the arrow A is provided (see FIG. 2).

The reformer 40 is a preliminary reformer for reforming higher hydrocarbon ($C_{2+}$) such as ethane ($C_2H_6$), propane ($C_3H_8$), and butane ($C_4H_{10}$) in the city gas (raw fuel) to a fuel gas chiefly containing methane ($CH_4$), hydrogen, and CO by steam reforming. The operating temperature of the reformer 40 is several hundred ° C.

The operating temperature of the fuel cell 32 is high, at several hundred ° C. In the electrolyte electrode assembly 28, methane in the fuel gas is reformed to obtain hydrogen and CO, and the hydrogen and CO are supplied to the anode.

As shown in FIG. 3, the heat exchanger 36 has a first exhaust gas channel 44 as a passage of a consumed reactant gas (hereinafter also referred to as the exhaust gas or the combustion exhaust gas) discharged from the fuel cell stack 34 and an air channel 46 as a passage of the air for allowing the air as a cooling medium (heated fluid) to flow in a counterflow manner with respect to the exhaust gas. The first exhaust gas channel 44 is connected to a second exhaust gas channel 48 for supplying the exhaust gas to the evaporator 38 as a heat source for evaporating water. The first exhaust gas channel 44 is connected to an exhaust gas pipe 50. The upstream side of the air channel 46 is connected to an air supply pipe 52, and the downstream side of the air channel 46 is connected to an oxygen-containing gas supply passage 53 of the fuel cell stack 34.

The evaporator 38 has dual pipe structure including an outer pipe member 54a and an inner pipe member 54b provided coaxially. The dual pipe is provided in the second exhaust gas channel 48. A raw fuel channel 56 is formed between the outer pipe member 54a and the inner pipe member 54b. Further, a water channel 58 is formed in the inner pipe member 54b. The second exhaust gas channel 48 of the evaporator 38 is connected to a main exhaust pipe 60.

The outer pipe member 54a is connected to a mixed fuel supply pipe 62 coupled to an inlet of the reformer 40. One end of a reformed gas supply channel 64 is coupled to an outlet of the reformer 40, and the other end of the reformed gas supply channel 64 is connected to the fuel gas supply passage 66 of the fuel cell stack 34. Instead of the dual pipe structure, the evaporator 38 may include a heater and a mixer (e.g., ejector type mixer).

As shown in FIG. 2, the raw fuel supply apparatus 16 is connected to the raw fuel channel 56. The oxygen-containing gas supply apparatus 18 is connected to an air supply pipe 52, and the air supply pipe 52 is connected to an air branch pipe 70 through a switching valve 68. An electric heater (e.g. a hot wind generator such as a non-flame torch) 72 for heating the fuel cell stack 34 is connected to the air branch pipe 70. Electricity is supplied to the non-frame torch, and the air flows along the non-frame torch to generate a hot wind. The water supply apparatus 20 is connected to the water channel 58.

The raw fuel supply apparatus 16, the oxygen-containing gas supply apparatus 18, and the water supply apparatus 20 are controlled by the control device 24. A detector 74 for detecting the fuel gas is electrically connected to the control device 24. For example, a commercial power source 76 (or secondary battery, or the like) and a load 77 are connected to the power converter 22. The commercial power source 76 is part of a reverse electrical current supply unit.

As shown in FIGS. 1 and 2, the fuel cell system 10 includes a first temperature sensor 78a for detecting the temperature of the fuel cell stack 34, a second temperature sensor 78b for detecting the temperature of the evaporator 38, a first pressure sensor 80a for detecting the pressure of the raw fuel supplied from the raw fuel supply apparatus 16 to the evaporator 38, a second pressure sensor 80b for detecting the pressure of the oxygen-containing gas supplied from the oxygen-containing gas supply apparatus 18 to the heat exchanger 36, and a third pressure sensor 80c for detecting the pressure of the water supplied from the water supply apparatus 20 to the evaporator 38.

The first temperature sensor 78a, the second temperatures sensor 78b, the first pressure sensor 80a, the second pressure sensor 80b, and the third pressure sensor 80c are connected to the control device 24. Flow rate sensors may be used instead of the first pressure sensor 80a, the second pressure sensor 80b, and the third pressure sensor 80c.

Figure 4:
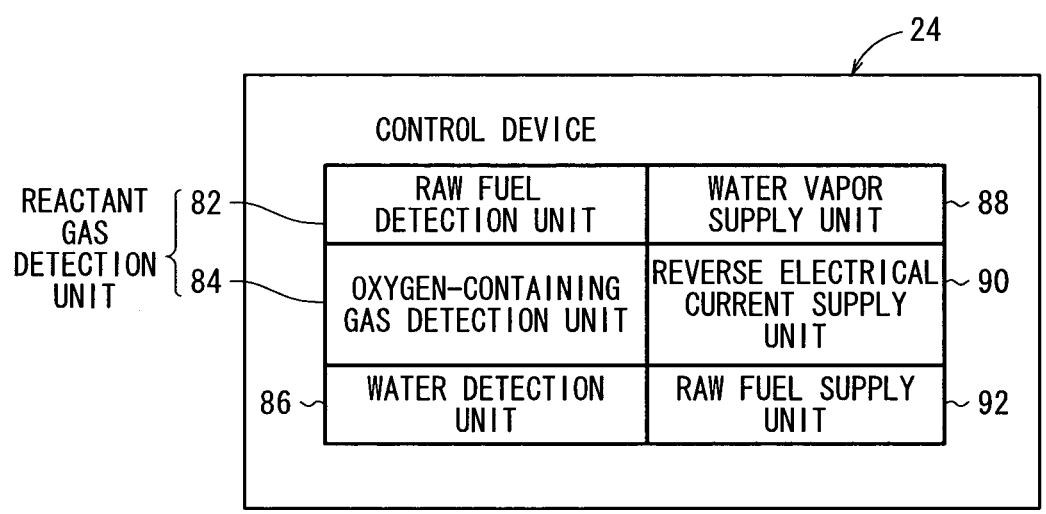
FIG. 4 is a diagram showing structure of a control device of the fuel cell system.

As shown in FIG. 4, the control device 24 has functions of a raw fuel detection unit (reactant gas detection unit) 82, an oxygen-containing gas detection unit (reactant gas detection unit) 84, a water detection unit 86, a water vapor supply unit 88, the reverse electrical current supply unit 90, and a raw fuel supply unit 92.

The raw fuel detection unit 82 detects a state where the supply of the raw fuel to the fuel cell module 12 is stopped, based on decrease in the pressure of supplying the raw fuel detected by the first pressure sensor 80a, or decrease in the flow rate of the supplied raw fuel detected by a flow rate sensor (not shown). Alternatively, the raw fuel detection unit 82 may detect the state where the supply of the raw fuel is stopped, based on decrease in the pressure or the flow rate of the supplied raw fuel and decrease in the stack output.

The oxygen-containing gas detection unit 84 detects a state where the supply of the oxygen-containing gas to the fuel cell module 12 is stopped, based on decrease in the pressure of supplying the oxygen-containing gas detected by the second pressure sensor 80b, or decrease in the flow rate of the supplied oxygen-containing gas detected by a flow rate sensor (not shown). Alternatively, the oxygen-containing gas detection unit 84 may detect the state where the supply of the oxygen-containing gas to the fuel cell module 12 is stopped, based on decrease in the pressure or the flow rate of the supplied oxygen-containing gas and decrease in the stack output and/or increase in the stack temperature.

The water detection unit 86 detects a state where the supply of water to the fuel cell module 12 is stopped based on decrease in the pressure of supplying the water detected by the third pressure sensor 80c, or based on decrease in the flow rate of the supplied water detected by a flow rate sensor (not shown).

When it is detected that the supply of the raw fuel or the oxygen-containing gas to the fuel cell module 12 is stopped, the water vapor supply unit 88 starts to supply the water vapor to the electrode surface of the anode based on the temperature of the fuel cell stack 34, and stops the supply of the water vapor at least based on any of the temperature of the fuel cell stack 34 and the temperature of the evaporator 38.

The reverse electrical current supply unit 90 starts to supply electrical current to the electrolyte electrode assembly 28, in a direction opposite to electrical current at the time of power generation, based on the temperature of the fuel cell stack 34, and stops the supply of the reverse electrical current at least based on any of the temperature of the fuel cell stack 34 and the temperature of the evaporator 38.

The raw fuel supply unit 92 temporarily stops supply of the raw fuel to the fuel cell module when the stop of the supply of water to the fuel cell module 12 is detected, starts supply of the raw fuel to the electrode surface of the anode based on the temperature of the fuel cell stack 34, and stops the supply of the raw fuel again based on the temperature of the fuel cell stack 34.

The control device 24 controls operation of the fuel cell system 10 based on a first temperature T1 (e.g., 550° C. or more) where the water vapor supply unit 88 starts to supply the water vapor to the electrode surface of the anode, a second temperature T2 (e.g., 550° C. or more) where the reverse electrical current supply unit 90 starts to supply electrical current to the electrolyte electrode assembly 28, in the direction opposite to the electrical current at the time of power generation, a third temperature T3 (e.g., less than 550° C.) where the reverse electrical current supply unit 90 stops the supply of electrical current to the electrolyte electrode assembly 28, in the direction opposite to the electrical current at the time of power generation, and a fourth temperature T4 (e.g., 300° C. or more, and less than 550° C.) where the water vapor supply unit 88 stops supply of the water vapor to the electrode surface of the anode. The first temperature T1 is equal to the second temperature T2, the second temperature T2 is higher than the third temperature T3, and the third temperature T3 is equal to or higher than the fourth temperature T4 (T1=T2>T3≥T4).

Further, the control device 24 controls operation of the fuel cell system 10 based on a fifth temperature T5 (e.g., 450° C. to 550° C.) for raw fuel supply start where the raw fuel supply unit 92 starts to supply of the raw fuel to the electrode surface of the anode and a sixth temperature T6 (e.g., 250° C. to 350° C.) for raw fuel supply stop where the raw fuel supply unit 92 stops the supply of the raw fuel again. The fifth temperature T5 is higher than the sixth temperature T6 (T5>T6).

Operation of the fuel cell system 10 will be described below.

As shown in FIGS. 1 and 2, by operation of the raw fuel supply apparatus 16, for example, a raw fuel such as the city gas (including $CH_4$, $C_2H_6$, $C_3H_8$, $C_4H_{10}$) is supplied to the raw fuel channel 56. Further, by operation of the water supply apparatus 20, water is supplied to the water channel 58, and the oxygen-containing gas such as the air is supplied to the air supply pipe 52 through the oxygen-containing gas supply apparatus 18.

As shown in FIG. 3, in the evaporator 38, the raw fuel flowing through the raw fuel channel 56 is mixed with the water vapor, and a mixed fuel is obtained. The mixed fuel is supplied to the inlet of the reformer 40 through the mixed fuel supply pipe 62. The mixed fuel undergoes steam reforming in the reformer 40. Thus, hydrocarbon of $C_{2+}$ is removed (reformed), and a reformed gas chiefly containing methane is obtained. The reformed gas flows through the reformed gas supply channel 64 connected to the outlet of the reformer 40, and the reformed gas is supplied to the fuel gas supply passage 66 of the fuel cell stack 34. Thus, the methane in the reformed gas is reformed, and the hydrogen gas and CO are obtained. The fuel gas chiefly containing the hydrogen gas and CO is supplied to the anode (not shown).

The air supplied from the air supply pipe 52 to the heat exchanger 36 moves along the air channel 46 in the heat exchanger 36, and heated to a predetermined temperature by heat exchange with the exhaust gas moving along the first exhaust gas channel 44. The air heated by the heat exchanger 36 is supplied to the oxygen-containing gas supply passage 53 of the fuel cell stack 34, and the air is supplied to the cathode (not shown).

Thus, in the electrolyte electrode assembly 28, by electrochemical reactions of the fuel gas and the air, power generation is performed. The hot exhaust gas (several hundred ° C.) discharged to the outer circumferential region of each of the electrolyte electrode assemblies 28 flows through the first exhaust gas channel 44 of the heat exchanger 36, and heat exchange with the air is carried out. The air is heated to a predetermined temperature, and the temperature of the exhaust gas is decreased.

When the exhaust gas moves along the second exhaust gas channel 48, the water passing through the water channel 58 is evaporated. After the exhaust gas passes through the evaporator 38, the exhaust gas is discharged to the outside through the main exhaust pipe 60.

Next, a method of emergency stop operation of the fuel cell system 10 will be described below.

Figure 5:
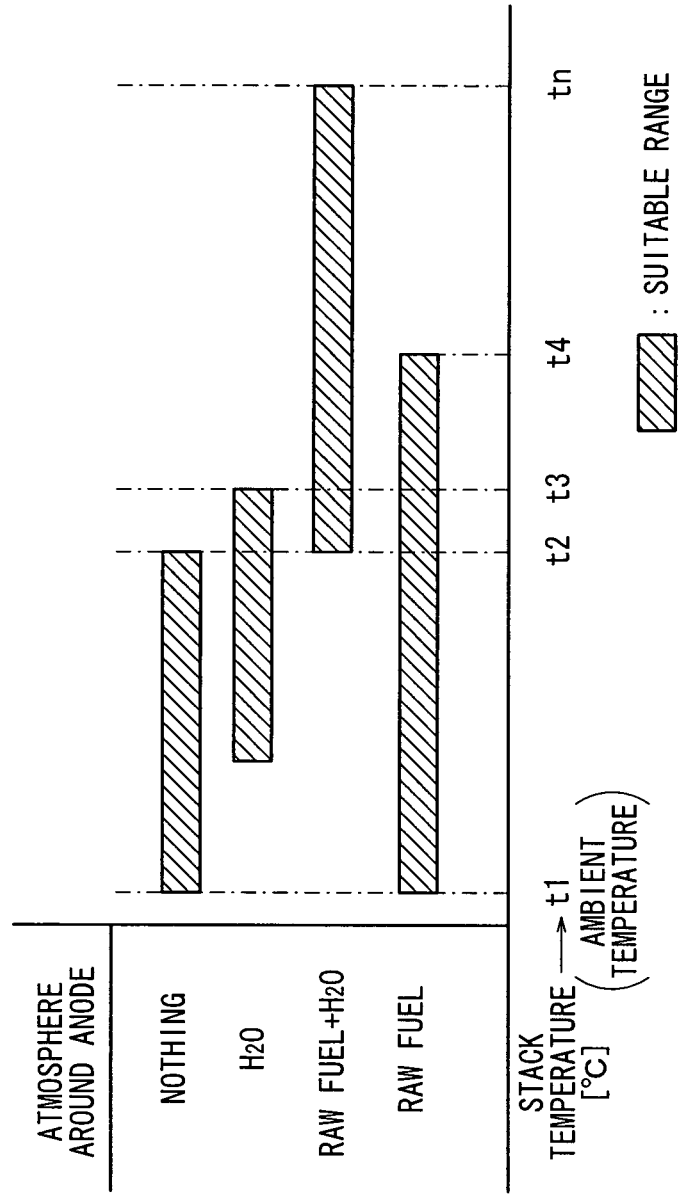
FIG. 5 is a map showing the relationship between the atmosphere around the anode and the stack temperature.

FIG. 5 shows the relationship between the temperature of the fuel cell stack 34 of the fuel cell system 10 (hereinafter also referred to as the stack temperature) and the atmosphere around the anode. That is, in the state where the anode is exposed to the oxygen atmosphere (see "nothing" in FIG. 5), when the stack temperature exceeds t2° C. (e.g., 300° C.), oxidation occurs easily at the anode. Further, in the state where the anode is exposed to the water vapor atmosphere, when the stack temperature exceeds t3° C. (e.g., 350° C.), water vapor oxidation occurs easily at the anode.

Further, when the anode is exposed to the raw fuel atmosphere, when the stack temperature exceeds t4° C. (e.g., 500° C.), coking may occur. In the case where the anode is exposed to the mixed fuel of the raw fuel and water vapor, when the stack temperature becomes t2° C. or less, operation of the evaporator 38 becomes unstable, and the S/C (molar ratio) becomes low. Thus, coking occurs, and water condensation may occur in the electrolyte electrode assembly 28 and the reformer 40. As a result, the electrolyte electrode assembly 28 and the reformer 40 are degraded undesirably.

Figure 6:
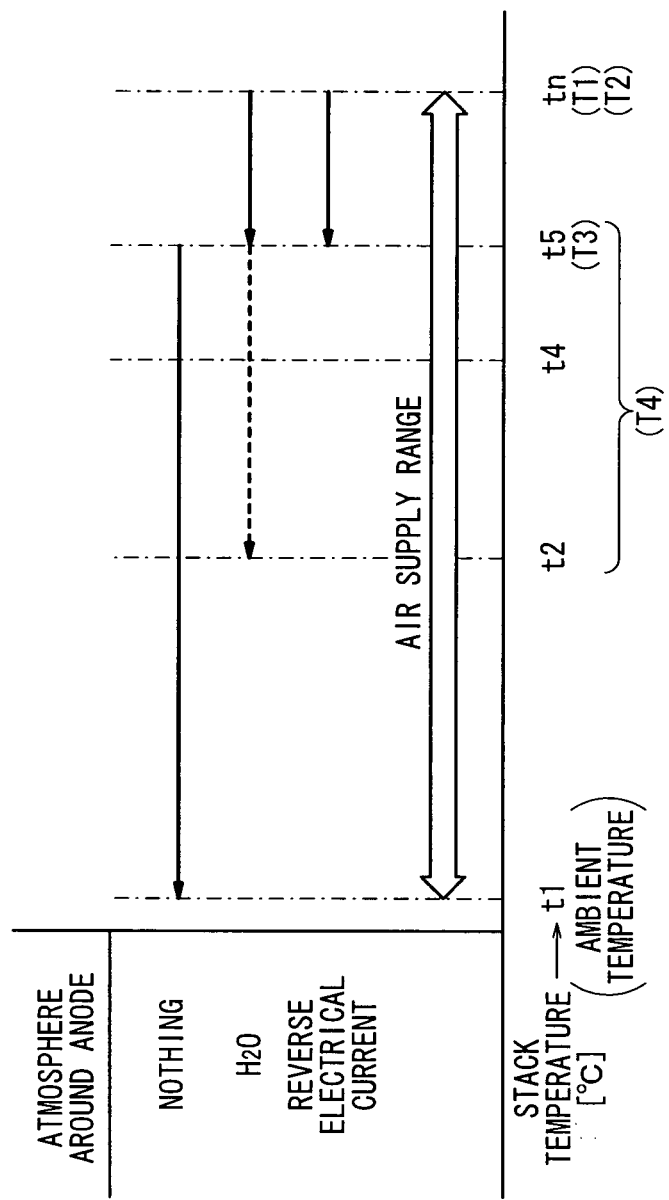
FIG. 6 is a control map of an emergency stop method at the time of stopping fuel supply.
Figure 7:
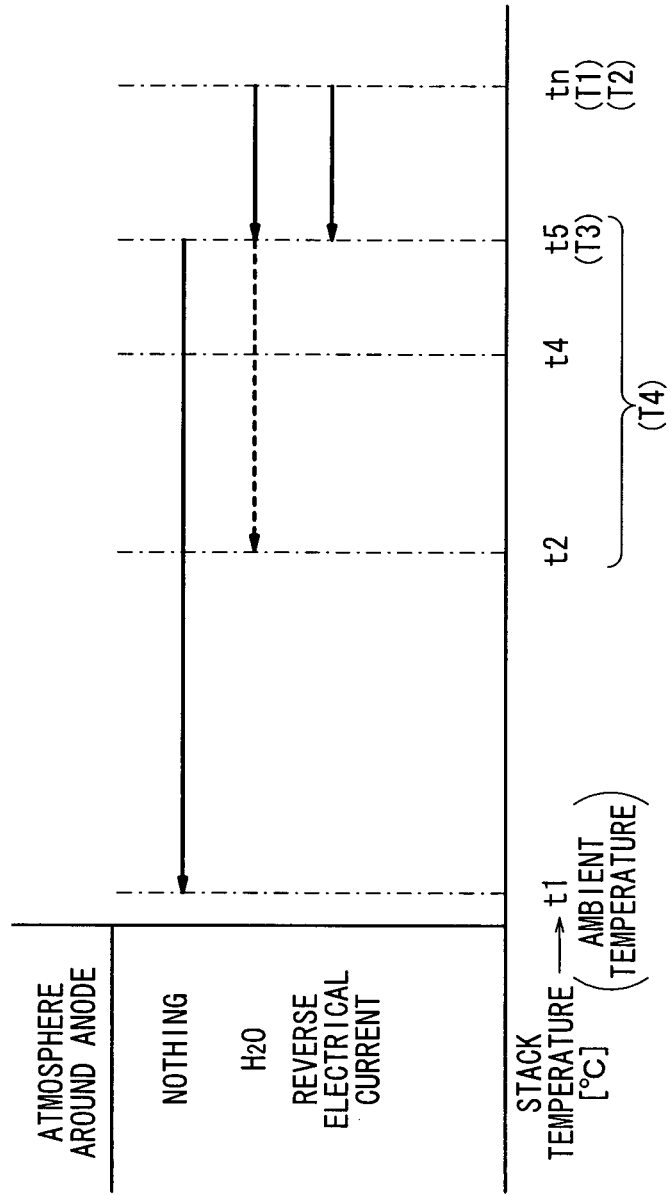
FIG. 7 is a control map of the emergency stop method at the time of stopping supply of an oxygen-containing gas.
Figure 8:
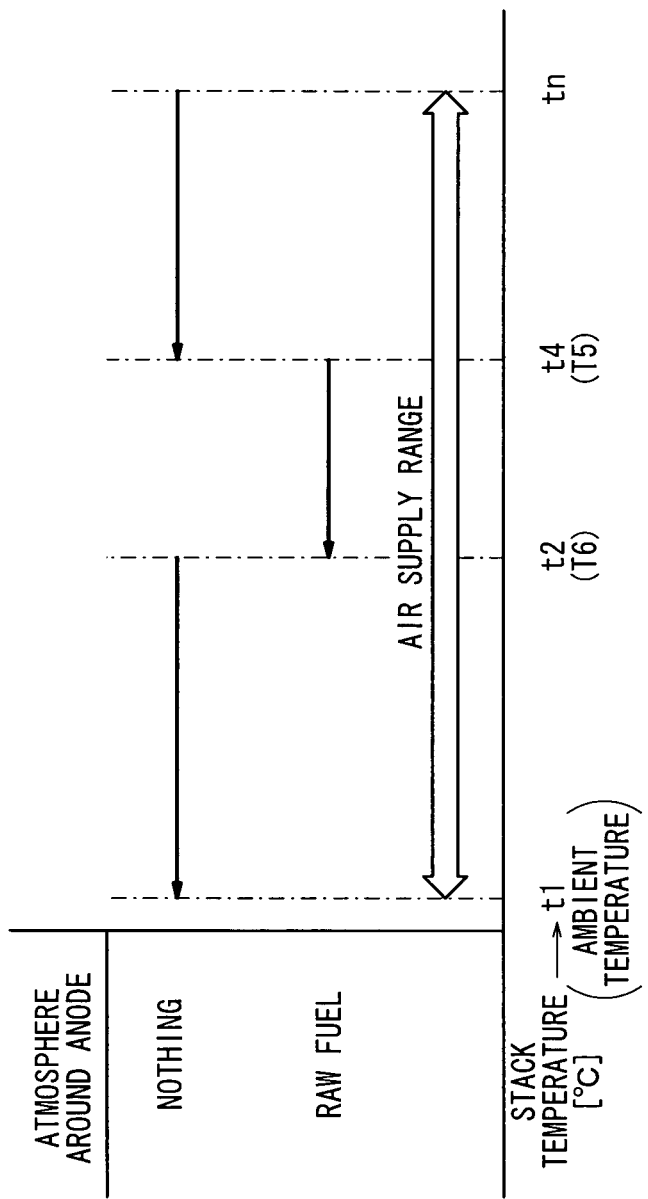
FIG. 8 is a control map of the emergency stop method at the time of stopping water supply.

In the embodiment, when supply of the raw fuel to the fuel cell module 12 is stopped, a control map (relationship between the atmosphere around the anode and the stack temperature) shown in FIG. 6 is selected. When supply of the oxygen-containing gas is stopped, a control map (relationship between the atmosphere around the anode and the stack temperature) shown in FIG. 7 is selected. When supply of the water is stopped, a control map (relationship between the atmosphere around the anode and the stack temperature) shown in FIG. 8 is selected.

Figure 9:
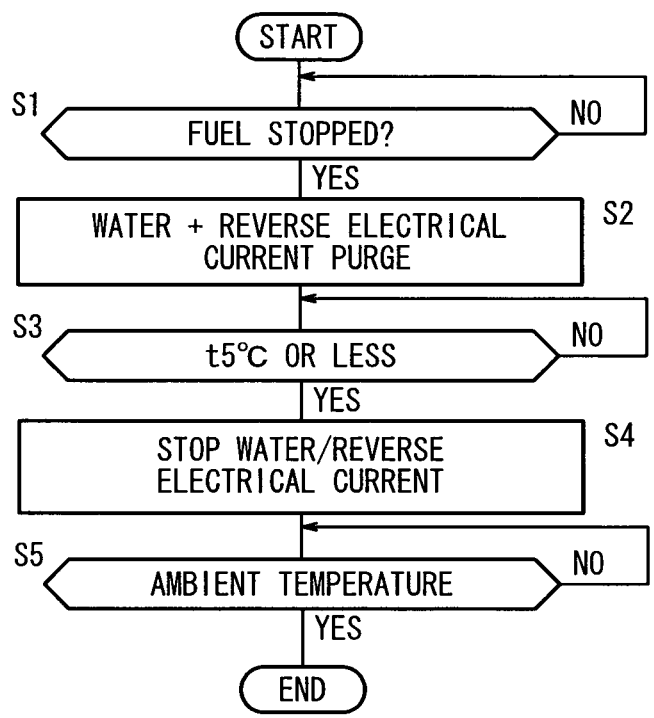
FIG. 9 is a flow chart of the emergency stop method at the time of stopping the fuel supply.

Firstly, an operating method when the supply of the raw fuel to the fuel cell module 12 is stopped will be described with reference to a control map in FIG. 6 and a flow chart in FIG. 9.

The raw fuel detection unit 82 determines that the supply of the raw fuel to the fuel cell module 12 is stopped by detecting decrease in the pressure of supplying the raw fuel using the first pressure sensor 80a (YES in step S1). Then, the routine proceeds to step S2, and water (water vapor) is supplied from the water supply apparatus 20 to the fuel cell module 12 (first temperature T1), and reverse electrical current is supplied to the fuel cell stack 34 through the commercial power supply (or secondary battery) 76 (second temperature T2).

The reverse electrical current herein means the electrical current flowing through each fuel cell 32 in the direction opposite to the electrical current flowing at the time of power generation. At the anode, electrolysis of the supplied water occurs to produce hydrogen, and oxygen moves toward the cathode. Therefore, the anode is maintained in a reducing state. Thus, it becomes possible to suitably prevent oxidation of the electrolyte electrode assembly 28 at high temperature due to the stop of the supply of the raw fuel.

Then, the routine proceeds to step S3. When it is detected that the temperature of the fuel cell stack 34 becomes t5° C. (third and fourth temperatures T3, T4), (e.g., 550° C.) or less (YES in step S3), the routine proceeds to step S4 to stop supply of the water and reverse electrical current. Thereafter, the fuel cell stack 34 is cooled to the ambient temperature by supplying the oxygen-containing gas to the cathode (not shown) (step S5). Thus, operation of the fuel cell stack 34 is stopped.

In step S4, when the stack temperature becomes t5° C. or less, the supply of the water is stopped. Alternatively, the supply of the water may continue until the stack temperature reaches t2° C. (fourth temperature T4). In this manner, the fuel cell stack 34 is cooled further rapidly.

In the embodiment, during operation of the fuel cell system 10, even if an emergency stop of the fuel cell system 10 becomes required by the stop of the supply of the fuel gas, it is possible to produce hydrogen on the electrode surface of the anode by water electrolysis. Thus, it becomes possible to prevent oxidation of the anode. Degradation of the fuel cell stack 34 is suppressed. Improvement in the reliability and durability is achieved easily, and the product life is prolonged advantageously.

Thus, it is possible to emergently stop operation of the fuel cell system 10 simply by setting the timings of supplying and stopping the water vapor (water) and the reverse electrical current without requiring any purge gas supply system additionally. Accordingly, the fuel cell system 10 is simplified, and can be provided at low cost easily.

Further, in the present embodiment, for example, at the time of supplying the water and reverse electrical current in step S2, the pressure of the raw fuel is detected by the raw fuel detection unit 82. Thus, when it is detected that the supply of the raw fuel to the fuel cell stack 34 is resumed before the stack temperature becomes t5° C. or less, the supply of the reverse electrical current is stopped, and the raw fuel is supplied to the fuel cell stack 34. Thus, the fuel cell system 10 is returned to the normal mode of operation.

Further, an electric heater 72 is provided next to the fuel cell stack 34. In the structure, for example, during the process in step S2, the oxygen-containing gas supply apparatus 18 supplies the oxygen-containing gas (air) to the electric heater 72 by operating the switching valve 68. Electricity is supplied to the electric heater 72 to generate a hot wind for maintaining the temperature of the fuel cell stack 34 at t5° C. or more. While maintaining the temperature of the fuel cell stack 34 at t5° C. or more by the electric heater 72 for a predetermined period of time, if it is detected that the supply of the raw fuel is resumed, the fuel cell system 10 can return to perform its normal operation. Thus, it is possible to resume operation of the fuel cell system 10 rapidly and suitably.

Figure 10:
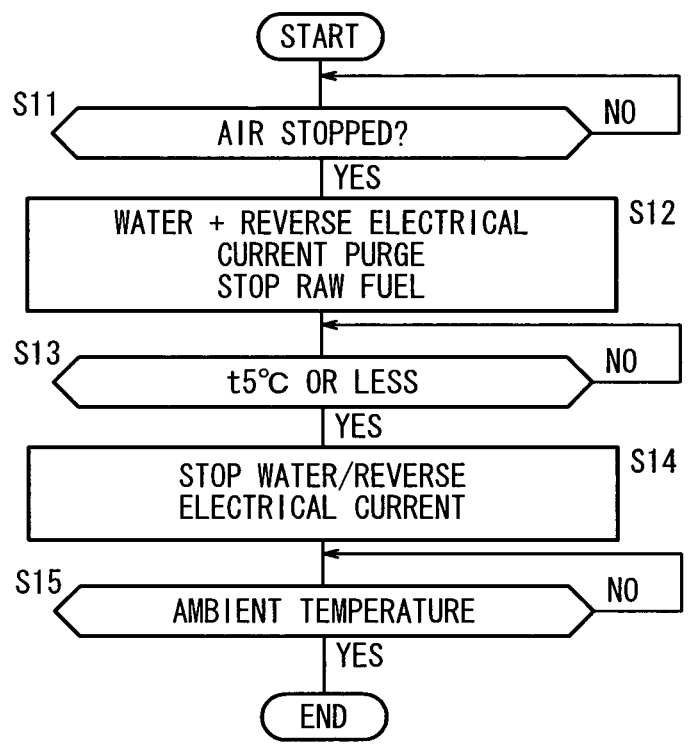
FIG. 10 is a flow chart of the emergency stop method at the time of stopping the supply of the oxygen-containing gas.

Next, an operation method when the supply of the oxygen-containing gas to the fuel cell module 12 is stopped will be described with reference to a control map shown in FIG. 7 and a flow chart shown in FIG. 10.

The oxygen-containing gas detection unit 84 detect a state where the supply of the oxygen-containing gas is stopped based on decrease in the pressure for supplying the oxygen-containing gas to the fuel cell module 12 detected by the second pressure sensor 80b (step S11). When the stop of the supply of the oxygen-containing gas is detected (YES in step S11), the routine proceeds to step S12 to start the supply of the water and reverse electrical current. At this time, the supply of the raw fuel to the fuel cell module 12 is stopped. That is, the supply of the fuel gas to the anode is stopped. Thus, the fuel gas supplied to the anode does not flow around to the cathode, and degradation of the electrolyte electrode assembly 28 is prevented.

Accordingly, after the supply of the fuel gas to the anode is stopped, hydrogen is produced at the anode by water electrolysis, and the anode is maintained in a reducing state. Thus, even if the electrolyte electrode assembly 28 has a relatively high temperature, it is possible to reliably prevent oxidation of the anode.

In step S13, when the stack temperature becomes t5° C. or less (YES in step S13), the routine proceeds to step S14 to stop the supply of the water and the reverse electrical current. The fuel cell stack 34 is cooled to the ambient temperature (step S15). In step S14, when the stack temperature becomes t5° C. or less, the supply of the water is stopped. Alternatively, as in the case of stopping the fuel supply, the water supply may continue until the stack temperature becomes t2° C. to accelerate the cooling of the fuel cell stack 34.

Further, since the supply of the oxygen-containing gas is stopped, it is not possible to supply the air to the electric heater 72, making it impossible to maintain the temperature of the fuel cell stack 34 by the electric heater 72. Therefore, in the case where the oxygen-containing gas detection unit 84 detects that the supply of the oxygen-containing gas is resumed before the stack temperature becomes t5° C. or less, it is preferable that the fuel cell system 10 returns to perform its normal operation. In this manner, operation of the fuel cell system 10 is resumed rapidly and suitably.

Figure 11:
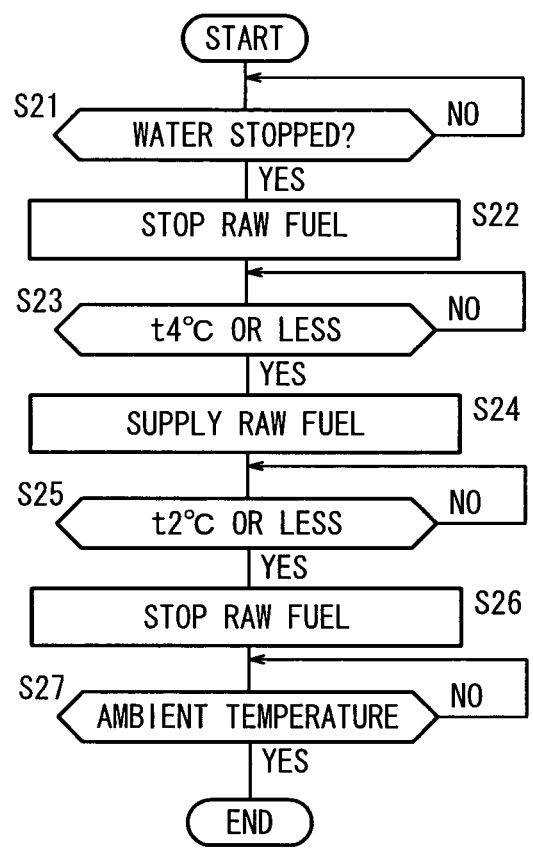
FIG. 11 is a flow chart of the emergency stop method at the time of stopping the water supply.

Next, an operation method when the supply of the water (water vapor) to the fuel cell module 12 is stopped will be described with reference to a control map in FIG. 8 and a flow chart in FIG. 11.

Firstly, the water detection unit 86 detects the state where the supply of water to the fuel cell module 12 is stopped by detecting decrease in the pressure of supplying the water by the third pressure sensor 80c (step S21). When the stop of the supply of water to the fuel cell module 12 is detected (YES in step S21), the routine proceeds to step S22 to stop the supply of the raw fuel from the raw fuel supply apparatus 16. The supply of the raw fuel is stopped because coking occurs in the electrolyte electrode assembly 28 easily if only the raw fuel is supplied in the state where the water supply is stopped at high temperature.

If the stack temperature becomes t4° C. (fifth temperature T5) or less (YES in step S23), the routine proceeds to step S24 for supplying the raw fuel by the raw fuel supply apparatus 16 to purge the oxygen-containing gas which has flown around to the anode. When the stack temperature becomes t2° C. (sixth temperature T6) or less (YES in step S25), the supply of the raw fuel is stopped (step S26). It is because no oxidation occurs if the stack temperature becomes t2° C. (sixth temperature T6) or less. Then, the fuel cell stack 34 is cooled to the ambient temperature by the air supplied to the cathode (step S27).

As in the case of the emergency stop process at the time of stopping the supply of the raw fuel, the water detection unit 86 detects that the water supply has been resumed before the stack temperature becomes t4° C. or less, or the temperature of the fuel cell stack 34 is maintained at t4° C. or more for a certain period of time by the electric heater 72. Thus, operation of the fuel cell system 10 is resumed rapidly and suitably.

As described above, in the embodiment, when the water supply is prevented, since the supply of the raw fuel to the electrode surface of the anode is temporarily prevented, it is possible to prevent occurrence of coking. Further, by supplying the raw fuel, and stopping the supply of the raw fuel to the electrode surface of the anode, it is possible to maintain the electrode surface of the anode in the reducing state, and oxidation of the electrolyte electrode assembly 28 is prevented suitably.

Thus, by stopping the supply of water vapor, even if emergency stop becomes required, it is possible to suppress degradation of the fuel cell stack 34. Improvement in the reliability and durability is achieved easily, and the product life is prolonged advantageously.

Accordingly, it is possible to emergently stop operation of the fuel cell system 10 due to the stop of the water supply to the fuel cell system 10 simply by setting the timings of supplying and stopping the raw fuel without requiring any purge gas supply system additionally.

Although certain preferred embodiments of the present invention have been shown and described in detail, it should be understood that various changes and modifications may be made therein without departing from the scope of the appended claims.

The invention claimed is:

1. A fuel cell system comprising a fuel cell module and a control device, the fuel cell module comprising:

a fuel cell stack formed by stacking a plurality of fuel cells for generating electricity in power generation consuming a fuel gas and an oxygen-containing gas supplied to the fuel cells, the fuel cells each formed by stacking an electrolyte electrode assembly and a separator, the electrolyte electrode assembly including an anode, a cathode, and an electrolyte interposed between the anode and the cathode;

an evaporator for producing a mixed fuel of a raw fuel chiefly containing hydrocarbon and water vapor obtained by evaporating water; and a reformer for producing the fuel gas by reforming the mixed fuel, the control device comprising:

a reactant gas detection unit for detecting a state where supply of the raw fuel or the oxygen-containing gas to the fuel cell module is stopped;

a water vapor supply unit for starting the supply of the water vapor to an electrode surface of the anode based on a temperature of the fuel cell stack when the stop of the raw fuel or the oxygen-containing gas to the fuel cell module is detected, and stopping the supply of the water vapor at least based on any of the temperature of the fuel cell stack and a temperature of the evaporator; and a reverse electrical current supply unit for starting supply of reverse electrical current to the electrolyte electrode assembly in a direction opposite to electrical current flowing at the time of power generation based on the temperature of the fuel cell stack, and stopping the supply of the reverse electrical current at least based on any of the temperature of the fuel cell stack and the temperature of the evaporator.

2. A fuel cell system according 1, wherein the fuel cell system is operated based on:

a first temperature where the water vapor supply unit starts to supply the water vapor to the electrode surface of the anode;

a second temperature where the reverse electrical current supply unit starts to supply the reverse electrical current to the electrolyte electrode assembly in the direction opposite to electrical current at the time of power generation;

a third temperature where the reverse electrical current supply unit stops the supply of the reverse electrical current to the electrolyte electrode assembly in the direction opposite to electrical current at the time of power generation; and a fourth temperature where the water vapor supply unit stops the supply of the water vapor to the electrode surface of the anode, and the first to fourth temperatures have the following relationship:

the first temperature=the second temperature>the third temperature≥the fourth temperature.

* * * * *